United States Patent [19]

Beam et al.

[11] Patent Number: 4,701,066
[45] Date of Patent: Oct. 20, 1987

[54] DECORATIVE SOUND ABSORBING PANEL FOR FURNITURE

[75] Inventors: John W. Beam, Princeton; Edmund T. Paquette, Shrewsbury, both of Mass.

[73] Assignee: Wright Line, Incorporated, Worcester, Mass.

[21] Appl. No.: 865,111

[22] Filed: May 20, 1986

[51] Int. Cl.⁴ .............................................. F16B 12/26
[52] U.S. Cl. ...................................... 403/298; 52/586
[58] Field of Search .................................. 403/292-298, 403/401, 402, 403; 52/586, 144, 145, 511; 312/263, 264, 257 R, 257 A, 6, 25 T, 257 SK, 257 SM

[56] References Cited

U.S. PATENT DOCUMENTS

| 3,426,482 | 2/1969 | Mock | 52/656 |
| 3,546,842 | 12/1970 | Blum | 403/295 |
| 3,715,136 | 2/1973 | Yoshida | 403/292 |
| 3,760,547 | 9/1973 | Brenneman | 403/292 |
| 3,826,053 | 7/1974 | Cameron | 403/298 |
| 3,977,800 | 8/1976 | Cassel | 403/297 |
| 4,047,337 | 9/1977 | Bergstrom | 52/145 |
| 4,161,977 | 7/1979 | Baslow | 403/401 |

FOREIGN PATENT DOCUMENTS 6612692 3/1968 Netherlands ........................ 52/656

Primary Examiner—James L. Ridgill, Jr.
Attorney, Agent, or Firm—Hamilton, Brook, Smith & Reynolds

[57] ABSTRACT

Decorative sound absorbing panels 10 and 12 are assembled around furniture. The panels 10 and 12 are secured together at a miter joint 15 by a concealed snap fastener. The snap fastener comprises a male spline 14 having two arms 32 formed at a right angle. Female splines 34 located in adjacent beveled surfaces 16 of the miter, each receiving one arm of the male spline 14.

7 Claims, 7 Drawing Figures

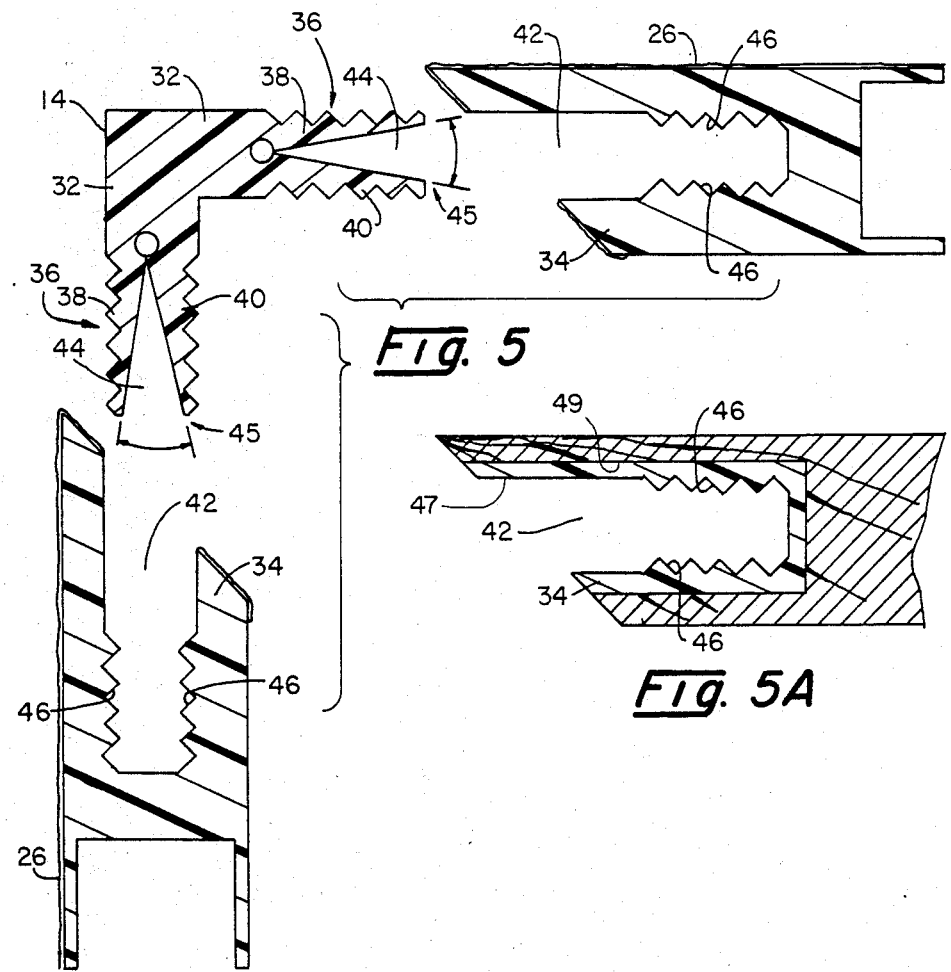

DECORATIVE SOUND ABSORBING PANEL FOR FURNITURE

FIELD OF THE INVENTION

The present invention relates to decorative, sound absorbing panels for furniture which panels are secured together by concealed interlocking fasteners.

BACKGROUND

Typical, office furniture such as storage cabinets are made of sheet metal and are generally rectangular boxes which lack asethetic appeal. Often, these cabinets are not positioned in the main part of an office because of their lack of asethetic appearance.

A problem with metal furniture, such as cabinets, is that the top and sides of the cabinets have hard surfaces which serve as mirrors for reflecting sound. As a result, background noises such as the sounds of typewriters, copying machines, telephones and other people's conversation serve to destroy workers acoustical privacy. Conversely, the ability to conduct private conversation without being overheard presents a problem. Therefore, in addition to improving the appearance of office furniture, there exists a need to protect workers from distracting background noise, as well as protecting their acoustical privacy.

DISCLOSURE OF THE INVENTION

The invention resides in an assembly of decorative panels for office furniture comprising: at least two side panels jointed to a top panel at a mitered corner by concealed interlocking fasteners. Each concealed fastener comprises a male and a female member. The female has a bifurcated spline with longitudinal tooth-like ridges. One female bifurcated spline is displaced within adjacent beveled planes of a top and a side panel forming the miter joint. A single male splined member, having two diverging bifurcated arms, is placed within the adjacent female spline members.

A further aspect of the invention resides in a sound absorbing core fitted within a frame of the panel and a decorative sound absorbing fabric wrapped around the frame.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

BRIEF DESCRIPTION OF THE DRAWINGS

FIG. 5 is a sectional view on an enlarged scale taken along the lines V—V on FIG. 4 of the male and female portions of the concealed fastener.

FIG. 5A is an alternate embodiment of the female member shown in FIG. 5.

DETAILED DESCRIPTION OF THE INVENTION

In order to improve the appearance as well as the usefulness of storage cabinets, decorative panels having sound absorbing insulation are, in accordance with this invention, assembled around cabinets using a concealed snap fastener.

Figure 1:
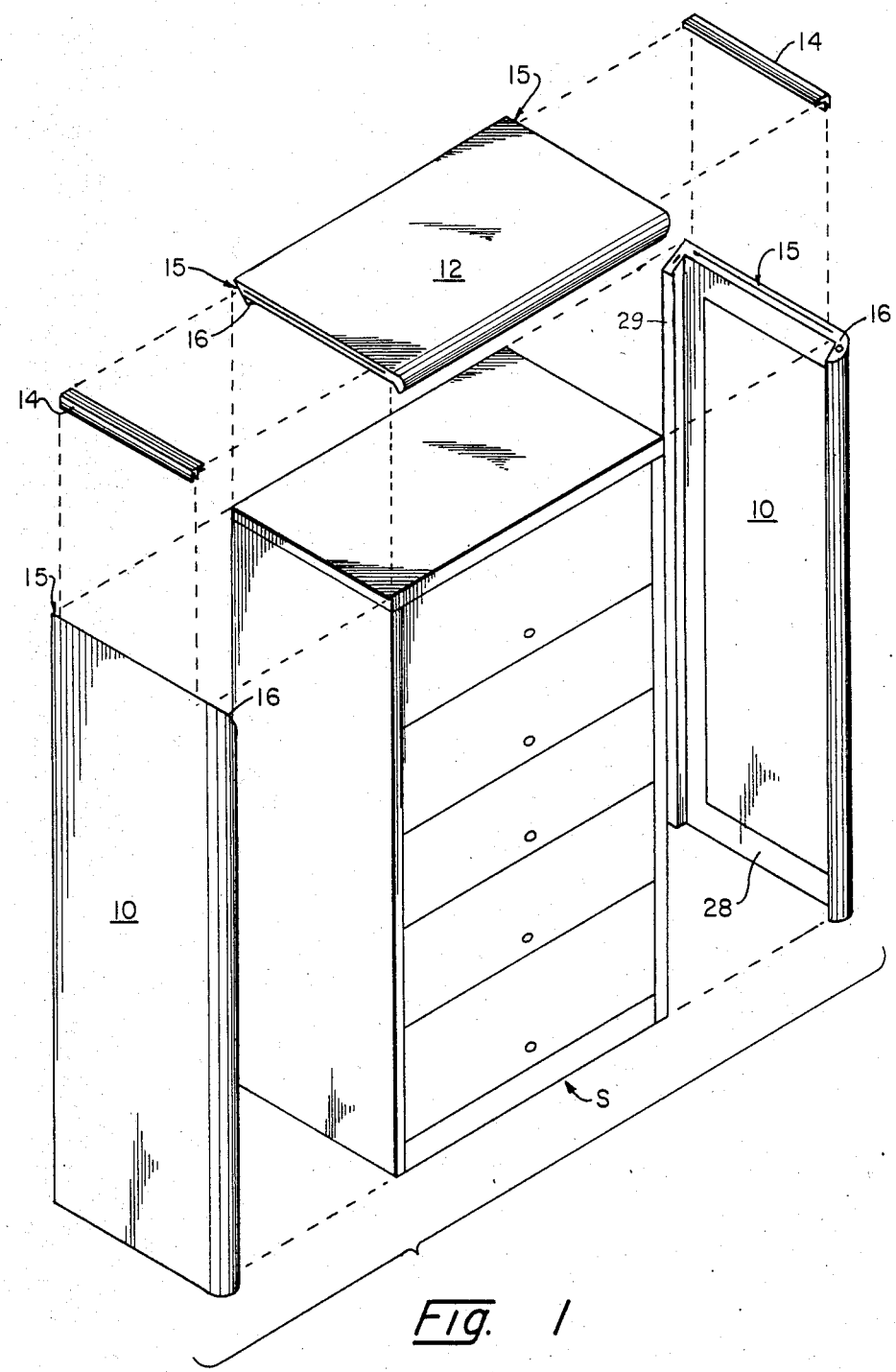
FIG. 1 is an exploded perspective view of decorative sound absorbing panels made in accordance with the present invention for assembly about a typical storage cabinet.

In FIG. 1 an exploded view shows an assemblage of two side panels 10 and a top panel 12 for positioning around a typical storage cabinet S. Male spline members or snap fasteners 14 (to be described in greater detail hereinafter) join the panels together along miter joints 15. Each fastener 14 becomes concealed when the panels 10 and 12 are assembled. Preferably, a portion 16 of the top and side panel which form the miter joint is beveled at a 45 degree angle. This angle results in a 90 degree joint when the panels are assembled.

Figure 2:
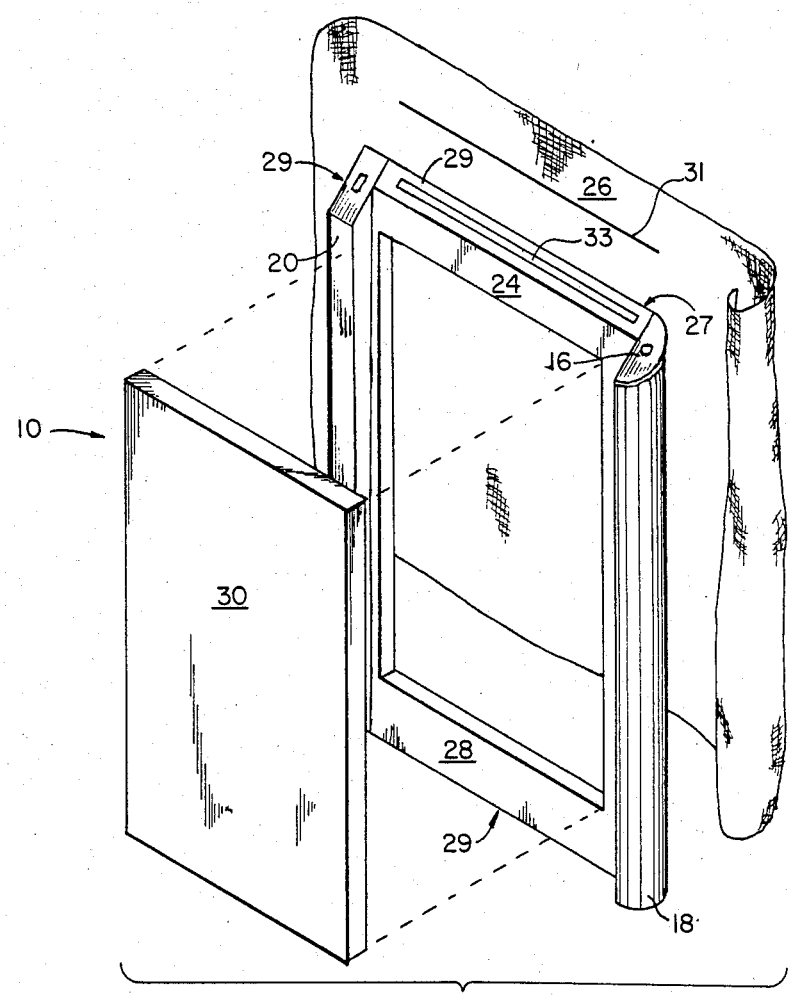
FIG. 2 is an exploded perspective view of a side panel with a single return and a tab.
Figure 3:
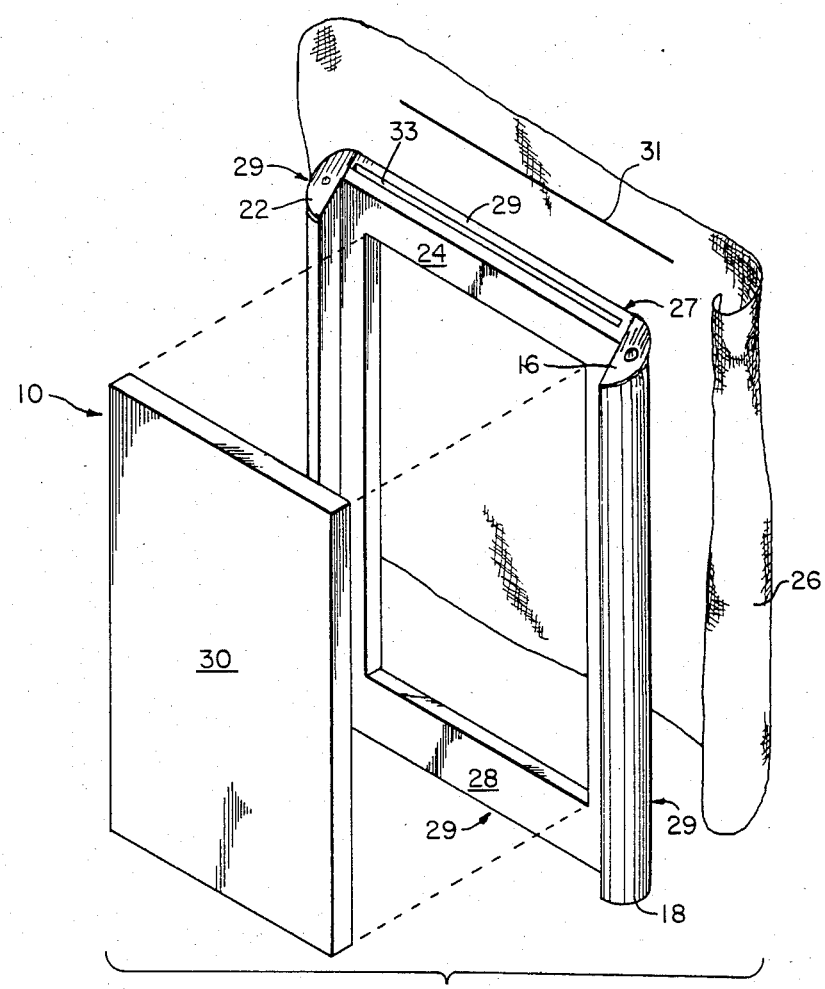
FIG. 3 is an exploded perspective view of a side panel with a double return.

An exploded view of one side panel 10 can be seen in FIGS. 2 and 3. As depicted in FIG. 2, the side panel 10 has a single return 18 and a tab 20. The return 18 is that portion of the panel which, upon assembly with a cabinet, curves around a corner of the cabinet. The tab 20 similarly fits around the corner of the cabinet but it is that portion of the panel which is a flat vertical strip which serves to grip the cabinet. Together, the single return 18 and the tab 20 prevent lateral motion of the panel once the panel has been assembled to the cabinet. In FIG. 3 the tab 20 shown in FIG. 2 has been replaced by a second return 22. By providing a second return on the panel, a rear panel (not shown) can be fitted to the existing top 12 and side panels 10. The top panel 12, although not shown, can similarly be constructed with a horizontally extending tab and a single return as shown in FIG. 2 or with two returns as shown in FIG. 3.

As can be seen in both FIGS. 2 and 3, a rectangular frame 24 supplies the support for the side panel 10. Preferably, the frame 24 is made from either wood or plastic, however, other materials such as aluminum may be used. The frame 24 has a front 27, a back 28, and four sides 29, one of which has a beveled surface 16. A decorative fabric 26, stretched over the front 27 and sides 29, is attached to the back side 28 of the frame. Fabric which is stretched over the beveled surface 16 of the frame 24 is slit at 31 to expose an elongated opening 33 which houses a female spline member 34 (described below) to engage male snap fastener 14 (see in FIGS. 1 and 5). Fabric having high acoustical properties is preferred.

Figure 4:
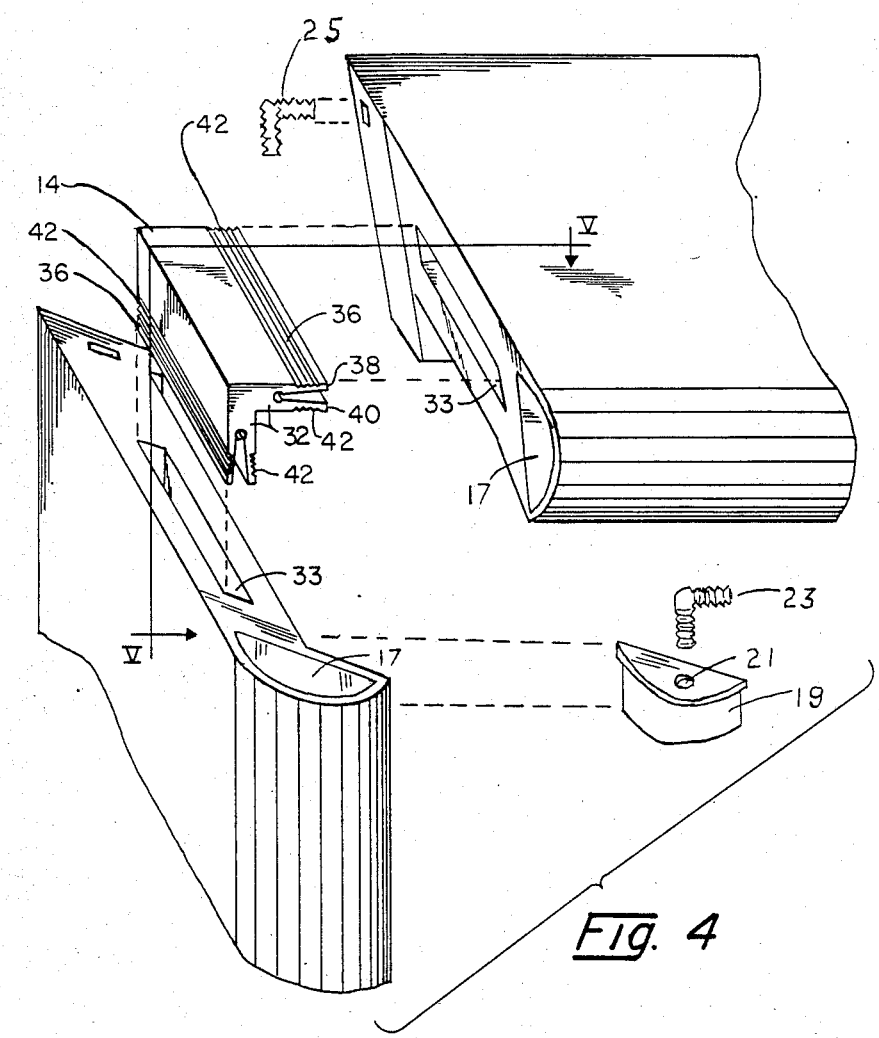
FIG. 4 is a magnified exploded perspective view of a miter joint including a male spline member.

In FIG. 4, a plastic frame is shown having a hollow interior 17 in the return which is formed in the extruding process to save material. The ends of the hollow interior 17 in the return are fitted with tapered plugs 19, only one of which is shown, before being covered with fabric 26.

Each tapered plug 19 has a hole 21 for receiving a miter ridge dowel 23. When assembled, the miter dowel is concealed and helps align the returns and secure the top and side panels. Similarly, a clip 25 is employed for aligning the tabs and securing the top and side panels.

Fitted within the frame 24 is a sound absorbtion core 30 (FIG. 3) which may be secured within the frame. Suitable means such as taping the core 30 to the frame 24 or placing the core 30 within grooves situated within the frame 24 may be employed. Many types of sound absorbtion material, such as fiber glass, are available on the market and may be employed. As constructed, the side panel 10 offers the advantages of reducing the effects of the hard metal surface of the cabinet which reflects sound and replaces it with decorative sound absorbing material. The top panel 12 is constructed similarly. The result is an office cabinet which improves office acoustics while improving the overall appearance of the cabinet S.

In FIG. 4, a magnified miter joint is shown. Here it can be seen that the male spline member 14 is in the form of a right angle and has two projecting, diverging arms 32. Each arm is bifurcated along a splined region 36 to form a first and a second finger 38 and 40, respectively, which fit within the mating female spline members 34 located within each beveled surface 16 of the panels forming the miter joint 15. The splined region 36 is comprised of a series of tooth-like ridges 42 located on the external surfaces of the first and second fingers 38 and 40. Correspondingly, a series of mating tooth like ridges 46 are located on the interior surface of the female spline members (not shown in FIG. 4). The length of the male spline member 14 is substantially the same length as the female spline member 34, however, a shorter male spline may be employed.

Depending on the substrate forming the frame of the panels 10 and 12, the female mating spline may either be formed within the frame (shown in FIG. 5) or be an insert 47 which is fitted into a socket 49 routed out of the beveled surface 16 (as shown in FIG. 5A). For example, in fabricating an extruded plastic frame, it is easier to fabricate the female spline along the length of the joint. When a wooden frame is employed it is easier to rout a socket for inserting the female spline. It is preferred, however, that both the male and the female spline members be made from plastic.

Figure 6:
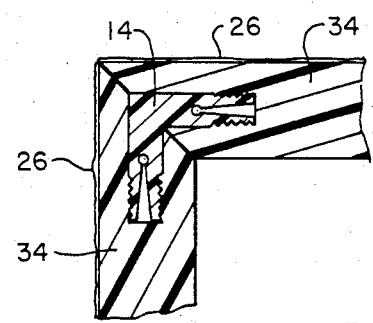
FIG. 6 is a sectional view of an assembled mitered joint.

A magnified, cross sectional view of the fastener components is shown in FIG. 5. The female spline 34 is shown to be engageable within both a plastic frame (FIG. 5) and a wood frame (FIG. 5A). From FIG. 5, it can be seen that the width of the male spline member 14 is substantially the same as the width of a mouth portion 42 of the female spline member 34. Ridges 46 of the female spline, however, extend into the mouth 42. As the arm 32 of the male spline 14 is inserted within the female spline 34, the fingers 38 and 40, which are compressed toward each other, snap tightly into place against ridges 46 of the female spline member 34 thereby forming an interlocking fastener (see FIG. 6). The number of ridges necessary for a secure fit is a function of the length of the splines and the weight of the panels and, therefore, it is possible to have a different number of ridges for a given length of spline.

Alternatively, the fingers 38 and 40 on each arm may be separated by an acute angle 44 whereby the open end 45 of the arm 32 will be slightly wider than the width of the mouth 42. Again, as the arm 32 of the male spline 14 is inserted within the female spline 34, the fingers will snap tightly into place against ridges 46 of the female spline member 34.

One of the primary advantages of employing this fastener is that it is concealed. Using fastening means such as screws or nails detract from the appearance.

Further, manufacturing panels which can be snapped together at the customers office is more desirable. A further advantage of the snap over other mechanical fasteners such as hook and pile cloth, double back tape, magnets or other alternatives is that a tighter joint results. With alternative fasteners there is a tendency for the side panels to sag. Additionally, the concealed snap fasteners allow a tight joint to result regardless of the surface material of the panel. For instance, a wooden top panel may be fitted to a panel having a fabric cover.

It has therefore been shown how a decorative panel having sound absorbing qualities can be added to office furniture using a concealed snap fastener.

While the invention has been particularly shown and described with references to preferred embodiments thereof, it will be understood by those skilled in the art that various changes in form and details may be made without departing from the spirit and scope of the invention as defined in the appended claims. For example, the panels described may also be applied to other office furnishings such as desks.

We claim:

1. An assembly of decorative panels for covering office furniture, comprising at least two panels,
   each panel comprising a multisided frame having on one side a beveled surface engageable with a similar beveled surface on an adjacent panel along which surfaces the panels join at a right angle,
   an elongated opening in the beveled surface of each panel,
   a female, bifurcated, spline within the elongated opening, beneath the beveled surface of each panel, the female spline having a pair of legs, each leg having teeth facing toward each other,
   a male spline having a pair of legs at right angles with each other, each leg being bifurcated and each bifurcation having teeth facing away from each other to engage the teeth of one female spline in one panel,
   the teeth of the other male spline being engageable with the teeth of the other female spline when the beveled surfaces of each frame are in engagement, and,
   decorative fabric stretched across each panel.

2. A decorative panel as claimed in claim 1, wherein the fabric secured to the frame has high sound absorption characteristics.

3. A decorative panel as claimed in claim 1, further comprising a sound absorbing core attached to the frame.

4. A decorative panel as claimed in claim 1, wherein the frame has a single decorative return and a tab for engagement with a piece of furniture.

5. A decorative panel as claimed in claim 1, wherein the frame has a double decorative return, for engagement with a piece of furniture.

6. An assembly of decorative panels as claimed in claim 1, wherein the bifurcated portions of the legs of the male member are separated by an acute angle such that the further most extended end of each leg, before insertion, is wider than the opening of the female spline which it enters for interlocking the teeth of both the male and the female spline members together.

7. An assembly of decorative panels as claimed in claim 1, wherein each panel further includes a return which is aligned and fastened to an adjacent return at the miter joint by a miter dowel.

* * * * *